United States Patent [19]

Davis et al.

[11] Patent Number: 5,612,141
[45] Date of Patent: Mar. 18, 1997

[54] ADHESIVE TAPE COMPOSITIONS AND METHOD FOR COVERING ROOFS

[75] Inventors: James A. Davis, Indianapolis; Joseph R. Hoppert, Noblesville; Chester T. Chmiel, Granger; Brian S. Alexander, Sheridan, all of Ind.

[73] Assignee: Bridgestone/Firestone, Inc., Akron, Ohio

[21] Appl. No.: 430,875

[22] Filed: Apr. 28, 1995

Related U.S. Application Data

[62] Division of Ser. No. 330,041, Oct. 27, 1994, Pat. No. 5,504,136.

[51] Int. Cl.$^6$ ........................................ C08L 23/16
[52] U.S. Cl. ..................... 428/515; 525/232; 525/240
[58] Field of Search ......................... 428/515; 525/240, 525/232

[56] References Cited

U.S. PATENT DOCUMENTS

| | | | |
|---|---|---|---|
| 3,280,082 | 10/1966 | Natta et al. | 260/80.7 |
| 3,307,690 | 3/1967 | Bond et al. | 206/59 |
| 3,642,728 | 2/1972 | Canter | 260/79.3 R |
| 3,816,371 | 6/1974 | Baldwin et al. | 260/79.5 C |
| 3,819,552 | 6/1974 | Glanville et al. | 260/27 BB |
| 3,852,251 | 12/1974 | Maxey | 260/79.5 B |
| 4,335,026 | 6/1982 | Balinth | 524/271 |
| 4,379,114 | 4/1983 | Fujiki et al. | 264/248 |
| 4,404,056 | 9/1983 | Kakehi et al. | 156/244.11 |
| 4,426,468 | 1/1984 | Ornum et al. | 523/166 |
| 4,539,344 | 9/1985 | Van Ornum et al. | 523/166 |
| 4,581,092 | 4/1986 | Westley | 156/306.9 |
| 4,588,637 | 5/1986 | Chiu | 428/355 |
| 4,601,935 | 7/1986 | Metcalf et al. | 428/57 |
| 4,645,793 | 2/1987 | Von Hellens et al. | 534/518 |
| 4,657,958 | 4/1987 | Fieldhouse et al. | 524/247 |
| 4,687,794 | 8/1987 | Huddleston et al. | 523/351 |
| 4,855,172 | 8/1989 | Chiu | 428/57 |
| 4,919,976 | 4/1990 | Cesare et al. | 427/373 |
| 5,000,361 | 3/1991 | Briddell et al. | 222/575 |
| 5,095,068 | 3/1992 | Chiu | 524/525 |
| 5,216,066 | 6/1993 | Sandstrom et al. | 524/495 |
| 5,242,727 | 9/1993 | Briddell et al. | 428/42 |
| 5,260,111 | 11/1993 | Valaitis et al. | 428/57 |

OTHER PUBLICATIONS

"Ethylene–Propylene Rubbers" by Samuels, Copolymer Rubber & Chemical Corporation, pp. 147–168 (undated).

*Primary Examiner*—W. Robinson H. Clark
*Attorney, Agent, or Firm*—Frank J. Troy, Sr.

[57] ABSTRACT

An adhesive tape composition includes a polymer blend comprising at least one EPDM rubber, and preferably three EPDM rubbers in substantially equal amounts, and an adhesive-enhancing polymer selected from the group consisting of polyisoprene, polybutadiene, and ethylene-propylene copolymer and mixtures thereof. The tape adhesive composition further includes at least one tackifying additive compatible with said polymer blend and a sulfur and organic accelerator cure package for said polymer blend, the adhesive composition being devoid of butyl rubber which is found in most other adhesive tape compositions. This composition is seen as providing excellent long-term heat aging, weathering resistance, and low temperature properties as compared to adhesive tape compositions containing butyl rubber. Moreover, the adhesive tape composition provides more surface tack, better "quick-grab", and higher green strength as compared to adhesive tape compositions containing 100 percent EPDM rubber. A method is also provided for covering roofs which includes the step of employing the adhesive tape composition.

11 Claims, 1 Drawing Sheet

ADHESIVE TAPE COMPOSITIONS AND METHOD FOR COVERING ROOFS

This application is a division of application Ser. No. 08/330,041, filed Oct. 27, 1994, now U.S. Pat. No. 5,504,136.

TECHNICAL FIELD

The present invention relates generally to adhesive compositions and, more particularly, to pressure sensitive adhesive compositions, typically provided in the form of a preformed tape, for adhering or seaming together the overlapped edges of reinforced or unreinforced rubber sheeting material used for roofing. Specifically, the present invention relates to an adhesive tape composition comprising a polymer blend containing at least one EPDM rubber and an adhesive-enhancing polymer such as polyisoprene, polybutadiene, and ethylene-propylene copolymer and mixtures thereof, the polymer blend being devoid of butyl rubber found in the rubbery component of most other pressure sensitive adhesives. The adhesive tape composition typically includes a sulfur/accelerator cure package and provides excellent long-term heat aging, weathering resistance, and low temperature properties as compared to adhesive tape compositions containing butyl rubber. Moreover, the adhesive tape composition provides more surface tack, better "quick-grab", and higher green strength compared to adhesive tape compositions containing 100 percent EPDM rubber. A method is also provided for covering roofs which includes the step of employing the adhesive tape composition.

BACKGROUND OF THE INVENTION

Polymeric roof sheeting materials such as ethylene-propylene-diene terpolymer (EPDM), butyl rubber (IIR), neoprene, polyvinyl chloride, chlorinated polyethylene, thermoplastic polyolefin rubber and modified bitumen and the like are used as single ply roofing membranes for covering flat roofs typically found on industrial or commercial buildings. Such roofing membranes are customarily large elastomeric sheets which must be seamed or spliced together on the rooftop during installation. However, because these elastomeric (EPDM, neoprene and butyl-based, etc.) roofing membrane compositions are typically cured prior to being installed on a roof, they generally lack the ability to adhere to one another. Further, the seam or area of overlapping of the roof sheeting materials is subject to both short-term and long-term stresses such as those caused by roof movement, heavy winds, freeze-thaw cycles and thermal cycles. Such stresses may manifest themselves in shear forces or peel forces, i.e., the seam peels back under severe stress conditions or may cause a partially open seam (often referred to as a fish-mouth condition) under less severe conditions.

A variety of methods for adhering or seaming the roofing membranes together have been developed over the years. For example, solvent-based adhesives, which typically employ neoprene or butyl-based compounds, have been used to bond roof sheeting materials together by applying, with a brush or other similar means, the liquid or paste-like adhesives directly to the edge areas of the roofing membranes to be joined. However, these adhesives have limited storage life, and are highly toxic and flammable, making them environmentally undesirable. Moreover, application of these adhesives to the roof sheeting membranes is often time-consuming and requires skill in applying the adhesive evenly since streaking and uneven coatings are known to reduce bond strength between the adhesive and the rubber sheeting material.

Alternatively, uncured polymeric tapes containing no vulcanizing agents, i.e., non-curable tapes, have been developed. However, these tapes never cure, even after installation, and therefore, creep under stress is a significant problem associated with the use of these tapes on roofs.

Another type of adhesive composition often used for joining roofing sheet membranes together are those which are initially unvulcanized but which contain curatives so as to be vulcanizable. These adhesives, commonly referred to as rooftop curable adhesives, are typically used in the form of a preformed tape to bond sheet membranes and the like together. However, it is well known that, because the rooftop curable adhesives are uncured when initially installed on a roof, they are recognized as having low initial strengths and are not easily handled. Moreover, some rooftop curable adhesives can take several days or even weeks to achieve good adhesion.

To facilitate adhesion, some of these adhesives may include heat-activated or fast-acting cure systems. Those adhesives with fast-acting cure systems will require additional equipment to blend and extrude the tape mixture to prevent premature curing which can adversely affect the adhesive properties of the composition when applying the adhesive tape to the rooftop membranes. Those adhesives with heat-activated cure systems also will require comparable equipment at the job site to provide the necessary heat and pressure to the tape for joining the sheet membranes together.

Thus, it should be evident that only after an extended period of exposure to high rooftop temperatures or upon application of heat and pressure at the rooftop site is vulcanization achieved to provide the necessary peel and shear strengths required to prevent the seams from sliding or opening. Further, in order to obtain good adhesion, heat and pressure must be applied over a relatively lengthy period of time, thus increasing the time necessary for installation of the sheet membranes on the roof.

Accordingly, attempts have been made in the art to develop adhesive tape compositions which are easier to apply between the area of overlapping of the rubber sheeting membranes, and which provide sufficient seam peel and shear strengths to permit the splice formed by the bonding of the rubber sheeting membranes to withstand and resist heat aging and moisture penetration and other problems such as oxidation, hydrolysis and chemical attack from pooled water, as well as other short-term and long-term stresses as noted hereinabove. Unlike rooftop curable adhesives, these preformed adhesive tapes are at least partially cured prior to being installed upon the roof. Thus, they are far more deformation resistant and easier to handle than the unvulcanized, but vulcanizable adhesives noted hereinabove. These adhesives are also easier to remove from the release paper upon which they are stored prior to use. Nevertheless, these adhesives have the ability to adhere the roofing sheets together, with minimal pressure. Thus, these preformed adhesive tapes, and the adhesive tapes of the present invention, are often referred to as pressure sensitive adhesives.

In order to provide adhesion and a watertight seal between the tape and the rubber sheeting upon contact, these adhesive tapes typically include a tackifying additive compatible with the rubber employed such as polybutene. It has been found that polybutene, when used with a butyl rubber composition, provides an adhesive tape having sufficient surface tack and "quick-grab" as well as adequate green strength for use in adhering roofing sheet membranes together.

Accordingly, heretofore, most pressure sensitive adhesives used to join rubber roofing membranes together included a rubbery polymer composition based on butyl rubber or butyl rubber blended with various amounts of EPDM. The cured adhesive also included a cure package, typically based upon the use of a sulfur, peroxide or quinoid crosslinking system.

For example, Chiu U.S. Pat. Nos. 4,588,637, 4,855,172 and 5,095,068 disclose adhesive compositions, prepared in the form of a cured adhesive tape, which comprises butyl rubber-based compositions made by compounding a butyl rubber, a curing agent for the butyl rubber, carbon black, and a compatible tackifying additive.

Metcalf et al. U.S. Pat. No. 4,601,935 discloses a seaming tape comprising a carbon black-reinforced, compounded, lightly cured blend of a butyl rubber and a polyisobutylene. The seaming tape serves to adhere the primer-coated seam edges of EPDM membranes together.

Briddell et al. U.S. Pat. No. 5,242,727 discloses a cured adhesive tape composition which includes substantially equal amounts by weight of a rubbery polymer comprising a blend of EPDM, a halogenated butyl rubber or a halogenated isobutylene-based copolymer and polyisobutylene, a compatible tackifying additive and a compatible accelerator/cure package for the rubbery polymer blend.

It is clear that all of the above adhesive tape compositions include butyl rubber (IIR). The term "butyl rubber" as used herein is intended to include copolymers of isobutylene and isoprene as well as other rubbery copolymers comprising at least 50 percent by weight of an isoolefin having 4 or more carbon atoms and 50 percent or less by weight of an open chain conjugated diolefin having from 4 to 8 carbon atoms. "Butyl rubber" is intended to also include halogenated butyl rubber, such as chlorobutyl or bromobutyl rubber, as well as those types of butyl rubber in which conjugated diene functionality has been added in the linear backbone at the diolefin units, such as more particularly described in U.S. Pat. No. 3,816,371.

Butyl rubber is used in these adhesive tape compositions to enhance surface tack required for joining together two overlapped single-ply EPDM roofing membranes. However, butyl rubber tape compositions do not provide as good long-term aging and weather resistance properties as tape compositions based upon ethylene-propylene-diene terpolymers (EPDM). Moreover, EPDM-based tape compositions exhibit good low temperature properties as compared to butyl-based tape compositions and would clearly be more compatible with EPDM membranes and flashing materials.

Some patents have recognized the use of EPDM in tape compositions. For example, Fujuki et al. U.S. Pat. No. 4,379,114 discloses a curable tape which may include a vulcanizable, but unvulcanized EPDM rubber, butyl rubber, or a blend thereof. The curable tape may further include a vulcanizing agent and accelerator, a softening agent, and other ingredients such as fillers and the like.

Kakehi et al. U.S. Pat. No. 4,404,056 discloses a cold-vulcanizable adhesive tape having a Mooney viscosity of from about 5 to 25 and which includes a rubbery polymer comprising EPDM, butyl rubber or a blend thereof, as well as a vulcanizing agent, a vulcanization accelerator, an adhesive (tackifying) agent and a softening agent.

Westley U.S. Pat. No. 4,581,092 discloses a preformed adhesive tape composition comprising EPDM or halogenated butyl rubbers, at least one polyisocyanate, a low-temperature and a high-temperature tackifying additive, and at least one curing agent.

It will be appreciated, however, that the rubbery components of the adhesive tapes noted hereinabove comprise essentially 100 percent EPDM rubber, 100 percent butyl rubber or a blend of EPDM and butyl rubber. As noted hereinabove, butyl rubbers do not provide as good long-term aging and weather resistance properties as tape compositions based upon ethylene-propylene-diene terpolymers (EPDM). However, 100 percent EPDM compositions do not have very good surface tack, initial strength or "quick-grab". "Quick-grab" refers to the characteristic of the adhesive tape composition to develop immediate adhesion when placed in direct contact with the surface of cured sheets of polymeric roof sheeting material.

Thus, it should be clear that the EPDM-based adhesive compositions described hereinabove suffer from a significant disadvantage which materially limits their usefulness as pressure sensitive adhesives for bonding cured, elastomeric roof sheeting membranes together. While attempts may have been made heretofore to provide adhesive tape compositions which improve some of the properties in either 100 percent EPDM rubber-based or butyl rubber-based adhesive tape compositions, the need still exists in the art for an effective EPDM rubber-based adhesive tape composition and method of application for use in adhering together rubber sheets and for covering roofs which provide easy application, excellent peel and shear seam strength, excellent initial adhesive strength and "quick-grab" and better surface tack, and maintain long-term heat aging and weather resistance.

SUMMARY OF INVENTION

It is therefore, an object of the present invention to provide an EPDM-based adhesive tape composition which is particularly adaptable for use as an adhesive tape for joining together reinforced or unreinforced rubber sheeting material for covering roofs.

It is another object of the present invention to provide an adhesive tape composition, as above, which exhibits excellent peel adhesion and seam shear adhesion as well as dead-load shear strength.

It is yet another object of the present invention to provide an adhesive tape composition, as above, which has sufficient surface tack, and excellent initial strength and "quick-grab" for use in seaming roof sheeting membranes together.

It is still another object of the present invention to provide an adhesive tape composition, as above, which displays excellent long-term heat aging and weathering resistance.

It is a further object of the present invention to provide an adhesive tape composition, as above, which is compatible with EPDM roof sheeting and flashing materials.

It is yet a further object of the present invention to provide an adhesive tape, as above, which can be used to form a laminate seam of variable width between two layers of elastomeric roof sheeting.

At least one or more of the foregoing objects, together with the advantages thereof over the known art relating to adhesive tape compositions, which shall become apparent from the specification which follows, are accomplished by the invention as hereinafter described and claimed.

In general, the present invention provides an adhesive tape composition for adhering together the overlapped edges of two layers of rubber sheeting, the adhesive tape comprising a polymer blend comprising at least one ethylenepropylene-diene terpolymer and an adhesive-enhancing polymer selected from the group consisting of polyisoprene, polybutadiene and ethylene-propylene copolymer and mixtures thereof; at least one tackifying additive compatible with the polymer blend; and a cure package containing a curing agent and at least one accelerator for the polymer blend, the adhesive composition being devoid of butyl rubber.

The present invention also provides an adhesive tape composition for adhering together layers of polymeric sheet material, the adhesive tape composition comprising a polymer blend comprising from about 50 to about 90 parts by weight of at least one ethylene-propylene-diene terpolymer; and from about 10 to about 50 parts by weight of an adhesive-enhancing polymer selected from the group consisting of polyisoprene, polybutadiene and ethylene-propylene copolymer and mixtures thereof, to total 100 parts by weight of the polymer blend; from about 50 to about 250 parts by weight of at least one compatible tackifying additive, per 100 parts by weight of the polymer blend; and from about 1.25 to about 10 parts by weight of a cure package containing a curing agent and at least one accelerator for the polymer blend, per 100 parts by weight of the polymer blend.

The present invention further includes a laminate seam of flat rubber sheet material for roofing comprising two layers of sheet material, one of the layers at least partially overlapping the other layer; and an adhesive composition in the form of a pressure sensitive adhesive tape interposed between the area of overlapping of the layers to form a seam, the adhesive composition comprising a polymer blend of at least one EPDM rubber and an adhesive-enhancing polymer selected from the group consisting of polyisoprene, polybutadiene and ethylene-propylene copolymer and mixtures thereof; at least one compatible tackifying additive; and a cure package containing a curing agent and at least one accelerator, for the polymer blend, the adhesive composition being devoid of butyl rubber.

The present invention also includes a method for covering a roof comprising the steps of applying an adhesive tape composition to the edge area of at least one layer of a flat rubber sheet material, the adhesive tape composition including a polymer blend of at least one ethylene-propylene-diene terpolymer and an adhesive-enhancing polymer selected from the group consisting of polyisoprene, polybutadiene and ethylene-propylene copolymer and mixtures thereof; at least one compatible tackifying additive; and a cure package containing a curing agent and at least one accelerator, for the polymer blend, the adhesive composition being devoid of butyl rubber; applying a second layer of the flat rubber sheet material which overlaps both the adhesive tape composition and the edge area of the first flat rubber sheet material; and applying pressure to the overlapped area to form a seam; the sheet material having a seam peel adhesion value of at least about 2 pounds/inch and a seam shear adhesion value of at least about 10 pounds/square inch after aging for at least 24 hours.

The present invention further provides a method for adhering together two layers of reinforced or unreinforced rubber sheet material having edge areas, comprising the steps of applying an adhesive tape composition to the edge area of one of the layers of rubber sheet material, the adhesive tape composition including a polymer blend of at least one EPDM rubber and an adhesive-enhancing polymer selected from the group consisting of polyisoprene, and polybutadiene, and ethylene-propylene copolymer and mixtures thereof; at least one compatible tackifying additive; and a cure package containing a curing agent and at least one accelerator, for the polymer blend, the adhesive composition being devoid of butyl rubber; applying the edge area of the other layer of rubber sheet material to the opposite side of the adhesive tape composition, thereby overlapping the edge areas of the layers of rubber sheet material; and applying pressure to the overlapped edge areas to form a seam; the sheet material having a seam peel adhesion value of at least about 2 pounds/inch and a seam shear adhesion value of at least about 10 pounds/square inch, after aging for at least 24 hours.

PREFERRED EMBODIMENT FOR CARRYING OUT THE INVENTION

Figure 1:
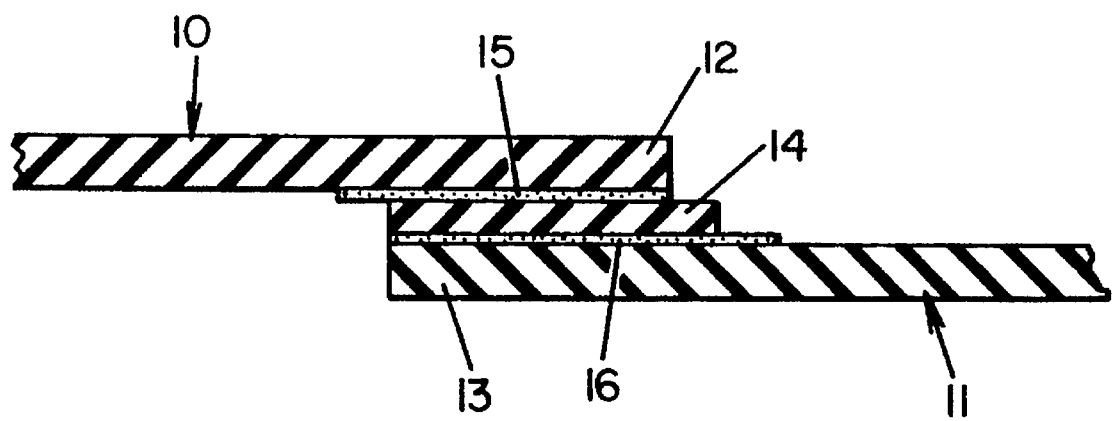
FIG. 1. is a vertical cross-section of two overlapping, single-ply EPDM roofing membranes, joined together at the primed seam area by an adhesive tape composition according to the present invention.

With reference to the drawings, FIG. 1 shows two layers of flat, roofing sheet membranes, 10 and 11, depicted with the edge area 12 of membrane 10 being overlapped by the edge area 13 of membrane 11 to form a seam. Interposed between these overlapped edges 12 and 13 is an adhesive tape 14 joining together the layers of roofing membranes to form a preferably watertight seam. Preferably, each edge area 12 and 13 contains a primer, 15 and 16, respectively, deposited from solution and air-dried on the edge area surface of each membrane to enhance bond formation.

Figure 2:
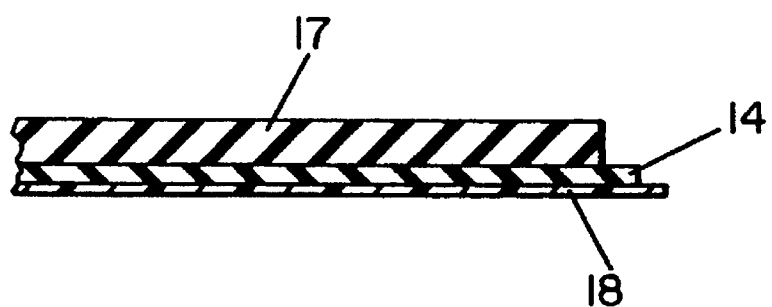
FIG. 2 is a vertical cross-section of a rubber sheet which has been mated with the adhesive tape composition to form a laminate according to the present invention.

FIG. 2 depicts a clean, uncured or cured, flat rubber sheet or flashing 17 to which the adhesive tape composition 14 is joined to form a laminate which may be used as a cover strip to cover the batten bar during the installation of a new roof or to repair an existing roof. A release paper 18 may be joined to the other tacky surface of the tape to prevent exposure of the surface to dust and the like prior to installation on the roof.

The adhesive tape 14 of the present invention is preferably a preformed, at least partially cured, tacky composition which possesses excellent initial strength, due at least in part to the cured nature of the composition, and is easy to apply to the flat rubber sheet membranes at the job site to adhere the membranes together. The tape possesses good storage stability, i.e., good shelf-life, and excellent "quick-grab" and has sufficient surface tack for rooftop installation.

More particularly, the adhesive tape composition includes a polymer blend containing at least one EPDM rubber and an adhesive-enhancing polymer such as polyisoprene, polybutadiene, and ethylene-propylene copolymer and mixtures thereof to enhance adhesion as detailed hereinbelow. Such an EPDM-based adhesive composition is seen as preferred over butyl rubber-based adhesive compositions in that the preferred composition possesses excellent heat aging and weathering resistance as compared to butyl rubber compositions. However, due to the addition of the adhesive-enhancing polymers in the blend, the tape compositions also possess better "quick-grab" and higher green strength than compositions based upon 100 percent EPDM.

As noted, the polymer blend used in the present invention includes at least one EPDM rubber. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082, the disclosure of which is incorporated herein by reference.

Preferably, at least two EPDM terpolymers are utilized to develop the tape composition. One of the polymers should have a relatively high weight average molecular weight of at least about 150,000. A second EPDM terpolymer should have a relatively low weight average molecular weight such as up to 125,000. If a third EPDM terpolymer is used, it should have a low to moderate weight average molecular weight such as from about 50,000 to 150,000.

The preferred EPDM rubbers suitable for use in the invention generally have a relatively low ethylene content of from about 45 percent to about 70 percent by weight, a polymer viscosity of about 10 to about 55 Mooney units ($ML_4$ at 125° C.) and a relatively low glass transition temperature (Tg) of from about −40° C. to about −60° C., and more preferably from about −45° C. to about −55° C. Further, the diene monomer utilized in forming the EPDM terpolymer is preferably a non-conjugated diene. The diene component of the terpolymer can be any of those commercially available, including but not limited to ethylidene norbornene, 1-4-hexadiene or dicyclopentadiene, with ethylidene norbornene (ENB) being preferred. Other illustrative examples of non-conjugated dienes which may be employed are alkyldicyclopentadiene, 1,4-pentadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. Moreover, the preferred EPDM rubbers have from about 2 to about 10 percent by weight unsaturation. The preferred EPDM rubbers may also have a specific gravity of about 0.86 at 23° C.

In addition, although any EPDM rubber can be used in the blend, preferred EPDM rubbers are amorphous or non-crystalline so as to provide for improved processability, especially during extrusion of the adhesive tape composition. Amorphous EPDM rubbers are also considered to have more surface tack than crystalline EPDM rubbers. Generally, preferred amorphous EPDM rubbers include those EPDM's having less then two percent by weight crystallinity as determined by DSC technique. In some instances, blends of major amounts of amorphous EPDM rubbers and minor amounts of crystalline EPDM rubbers may be used and may be preferred in this invention.

Particularly useful and preferred in preparing the EPDM portion of the polymer blend for use in the adhesive tape composition are EPDM rubbers commercially available from DSM Copolymer or Baton Rouge, La., under the trademark Keltan®; Exxon Chemical Company of Houston, Tex., under the trademark Vistalon®; Uniroyal Chemical Company of Naugatuck, Conn., under the trademark Royalene®; Miles Inc. (Polysar Rubber Division) under the trademark Polysar EPDM®; and E.I. DuPont de Nemours of Wilmington, Del., under the trademark Nordel®.

EPDM rubbers which are available from the above polymer suppliers are sulfur vulcanizable and have an ethylene content, a polymer viscosity, a glass transition temperature, and a specific gravity as noted hereinabove for preferred EPDMs.

More particularly, some suitable sulfur vulcanizable EPDM rubbers used to practice this invention include those which have a weight average molecular weight of at least about 150,000. Some examples of such high molecular weight EPDM rubbers include Vistalon® 7500, Vistalon® 3708, Vistalon® 4608, Vistalon® 5600, Vistalon® 6505, Royalene® 505, Royalene® 535, Keltan® 4506, Keltan® 4906, Keltan® 5206, Polysar EPDM® 826X, Nordel® 1145 and Nordel® 1660. The major function of these high molecular EPDM rubbers is to impart needed green strength to the tape composition. Sufficient green strength is needed to extrude the tape composition as well as during installation of the tape in a rooftop situation.

Other useful sulfur vulcanizable, EPDM rubbers having a weight average molecular weight ranging from about 10,000 to 125,000 include, for example, Trilene® 67, Trilene® 68, Keltan® 4200 and Keltan® DE-295. The EPDM rubbers having a low weight average molecular weight function to increase surface tack, act as a processing aid, and serve as a compatibilizing agent to facilitate incorporation of the liquid polybutene which may be added as a tackifying agent.

Other useful sulfur vulcanizable EPDM rubbers having a weight average molecular weight ranging from 50,000 to 150,000 include, for example, Royalene® 552, Royalene® 501, Royalene® 521, Keltan® 2506, Keltan® 378. These polymers enhance surface tack and provide additional green strength as well as impart smoothness to the surface of the tape extrudate.

The polymer blend also includes at least one adhesive-enhancing polymer selected from the group consisting of polyisoprene, polybutadiene and ethylene-propylene copolymer and mixtures thereof. By the term "adhesive-enhancing" it is meant that these polymers provide the tape compositions with more surface tack and better "quick-grab" which is essential during rooftop installation. In addition, these polymers provide the tape composition with higher green strength compared to tape compositions which do not include these polymers. Sufficient green strength is essential during the formation of seams with an adhesive tape composition, especially when the seams are being formed at elevated temperatures.

Any polyisoprene, polybutadiene or ethylene-propylene copolymer capable of imparting the characteristics noted hereinabove to the tape composition can be used in the polymer blend, although cis-1,4-polyisoprene and cis-1,3-polybutadiene are preferred. The preferred adhesive-enhancing polymers generally have a polymer viscosity of about 35 to 80 Mooney units (ML/4 at 100° C.), an ash content of less then about 0.7 percent by weight, and a specific gravity of about 0.86 to 0.91 at 23° C. The adhesive-enhancing polymers also preferably include less than about 3 percent by weight extractables.

Particularly useful and preferred polyisoprenes are commercially available from Goodyear Tire & Rubber Company under the registered trademark Natsyn®. Typical polyisoprenes include Natsyn® 2200 and 2210, high cis-1,4-polyisoprenes. It will be understood that other isomeric forms (those having different molecular patterns) of polyisoprene, e.g., trans-1,4, 1,2 or 3,4-addition may also have utility in this invention. Moreover, these preferred polyisoprenes have a glass transition temperature ranging from about −68° to −75° C., a weight average molecular weight ranging from about 500,000 to 950,000, and a number average molecular weight ranging from 175,000 to 350,000. Polyisoprenes can be incorporated into the tape composition in order to enhance green strength, increase modulus and tensile strength as well as provide a higher degree of resilience and minimize compression set. Use of polyisoprenes should also limit die swell and permit faster tape extrusion rates, especially at elevated temperatures.

Preferred polybutadienes include those commercially available from American Synthetic Rubber Corporation under the registered trademark Cisdene®; Goodyear Tire & Rubber Company under the registered trademark Budene®; Miles, Inc. (Polysar Rubber Division) under the registered trademark Taktene®; and H. Muehlstein & Company under the registered trademark Cariflex®. Typical polybutadienes include Cisdene® 1203, Budene® 1207, Budene® 1208, Taktene® 220, Taktene® 1203G1, Taktene® 1201, Taktene® 1220, and Cariflex® BR 1202D. The polybutadienes featuring the high cis microstructure (>90 percent cis 1,4) are preferred. Other typical properties of the polybutadienes which may be used to practice this invention, beyond those properties disclosed hereinabove, include the use of polybutadienes having a glass transition temperature ranging from about −104° C. to −108° C., a weight average molecular weight ranging from about 280,000 to 500,000, and a number average molecular weight ranging from about 85,000 to 150,000. Polybutadienes are incorporated into the tape composition in an effort to improve the green strength of the tape composition, produce lower heat buildup during both mixing and the extrusion process and excellent low temperature flexibility. Despite their high unsaturation, polybutadienes are very tacky, offer high resilience at low temperatures and have reasonable resistance to oxidation.

Particularly useful and preferred ethylene-propylene copolymers are available from Exxon Chemical Company under the registered trademark Vistalon® and Miles, Inc. (Polysar Rubber Division) under the registered trademark Polysar EPM®. Some preferred examples of ethylene-propylene copolymers include Vistalon® 404, Vistalon® 707, Keltan® 740 and Polysar EPM® 306. Some typical properties of ethylene-propylene copolymers include having an ethylene content of from about 45 percent to about 65 percent by weight, a Mooney viscosity (ML/$_4$ at 125° C.) of from about 25 to 55, a glass transition temperature of from about −40° C. to about −60° C., and more preferably from about −45° C. to about −55° C. Ethylene-propylene copolymers are without any unsaturation, and these polymers have excellent long-term heat and ozone aging resistance as well as provide a smooth, glossy appearance to the tape extrudate.

The polymer blends to be employed in the adhesive composition generally includes major amounts of EPDM and only minor amounts of the adhesive-enhancing polymer(s). In fact, the polymer blend typically includes at least 50 parts by weight EPDM and up to 50 parts by weight of at least one adhesive-enhancing polymer, at least 60 parts by weight EPDM and a maximum of about 40 parts by weight adhesive-enhancing polymer being preferred, and from about 90 parts by weight EPDM and 10 parts by weight adhesive-enhancing polymer being even more preferred, the polymer blend totaling 100 parts by weight. It will be appreciated that less than 10 parts by weight of at least one of the adhesive-enhancing polymers can be used, but does not provide optimum tape properties. When more than one EPDM is employed, a polymer blend which includes substantially equal amounts, by weight, of each EPDM rubber is preferred. Thus, for example, where the preferred amount of EPDM rubber is 90 parts by weight in the polymer blend and three EPDM rubbers are utilized, each EPDM would be included in amounts of about 25 to 35 parts by weight. Where amounts of EPDM rubber are not equal, it is preferred that the EPDM rubber having a low to moderate weight average molecular weight and an ethylene content ranging from about 45 to 60 percent by weight be employed in the greater amount.

More specifically, where three EPDM rubbers are employed, they are preferably employed in amounts ranging from about 25 to about 35 parts by weight of the first EPDM, from about 25 to about 35 parts by weight of the second EPDM, and from about 25 to about 35 parts by weight of the third EPDM, to total at least 90 parts by weight of the total polymer blend with the remaining amount being provided by the adhesive-enhancing polymer, to total 100 parts by weight.

The composition employed to form the adhesive tape of the present invention is generally comprised of a polymer blend comprising at least one EPDM and an adhesive-enhancing polymer selected from the group consisting of polyisoprene, polybutadiene, and ethylene-propylene copolymer and mixtures thereof, this polymer blend being discussed hereinabove, and further includes liquid and solid tackifying additives, and fillers as well as other conventional components including curatives or vulcanizing agents, as discussed hereinbelow. The amounts of tackifying additives, processing materials, fillers, curing agents, and other additives used in the tape composition will be expressed hereinafter as parts by weight per 100 parts by weight of the polymer blend contained in the composition and will be designated "phr".

The adhesive tape compositions of the present invention typically are compounded with one or more known liquid, semi-solid, or solid tackifying additives. These tackifying additives are generally employed to promote good tackiness in the adhesive composition. Generally, any tackifying additive or combination of tackifying additives which are compatible with the polymer blend may be used. Examples of suitable tackifying additives include polybutenes, paraffinic oils, petrolatum, phthalates, and various resins including but not necessarily limited to polyterpenes, terpene-phenolic, modified rosin and rosin esters, and hydrocarbon and phenolic resins. Resin is intended herein to refer to a variety of hard, brittle, solid, semi-solid or liquid organic substances. Resins may be either natural, i.e., rosin, or synthetic, i.e., coumarone-indene and phenol-formaldehyde. Rosin is basically a residue obtained from extracting pine wood chips with naphtha and distilling off the volatile fraction. Preferred tackifying additives include polybutene, and petroleum-derived hydrocarbon resins. Phenolic resins may also have utility in this invention.

Particularly useful tackifying resin additives used to practice this invention include low molecular weight, hydrogenated, petroleum-derived hydrocarbon resins commercially available from Exxon Chemical Company under the registered trademark Escorez®. Suitable tackifying resin additives include Escorez® 1304, Escorez® 1315. Escorez® 1504, Escorez® 5300, Escorez® 5320, and Escorez® 5380. These resins are characterized as being thermoplastic, hydrogenated aliphatic hydrocarbons having softening points of about 85° C. to 125° C., and weight average molecular weights ranging from about 360 to 2570.

Other noteworthy tackifying resins include Piccopale® 100 resin (a polyterpene resin) and Piccotac® B resin, both commercially available from Hercules Incorporated. Piccopale® 100 is a pale yellow, thermoplastic resin, having a softening point of about 100° C., an acid number of <1, and a specific gravity of about 0.95 at 23° C. Piccotac® B resin is a pale yellow, thermoplastic resin, having a softening point of about 98° C., an acid number of <1, and a specific gravity of about 0.95 at 23° C. Betaprene H-100 resin, a pale yellow, hard, friable aliphatic hydrocarbon resin having a softening point of about 100° C., a specific gravity of 0.92 at 23° C. and commercially available from Arizona Chemical Company is also available as a tackifying resin. In addition, other petroleum-derived hydrocarbon resins which impart excellent heat stability in pressure sensitive adhesive tape compositions include Eastotac®H-100 and H-115 which have softening points ranging from about 100° C. to about 115° C. and specific gravities of about 1.04 at 23° C., both of these resins being commercially available from Harwich Chemical.

Other particularly useful naturally occurring resins which can be incorporated in the tape composition to impart tack and improve heat stability include Foral® 85, a glycerol ester of hydrogenated rosin and Foral® 105, a pentaerythritol ester of hydrogenated rosin, both commercially available from Hercules Incorporated. Some additional naturally occurring resins which are chemically based on esters of pentaerythritol include Pentalyn® A and Pentalyn® H which may be used to enhance tack, are both commercially available from Hercules Incorporated.

Other particularly useful aliphatic hydrocarbon resins are the highly viscous liquid petroleum-derived resins available under the trademark Escorez® 2520. Such a resin has a softening point of about 20° C., a molecular weight of 380, and a specific gravity of about 1.02 at 15.5° C. This resin serves as a processing aid as well as impart additional tack to the surface of the tape extrudate.

Other tackifying additives include polybutenes such as those commercially available from Amoco Chemical Corporation under the registered trademark Indopol®. Polybutenes are a series of colorless isobutylene-butene copolymers composed predominantly of high molecular weight monoolefins (95–100 percent), with the balance being isoparaffins. They are chemically stable, permanently-fluid liquids with a moderate to high viscosity, and resistant to oxidation by heat and light. The amount of liquid polybutene which can be utilized can vary from about 50 to as high as about 250 phr, with a range of from about 90 to about 175 phr being most preferred. Some of the liquid polybutenes used in the tape composition of the present invention include Indopol® H-100, H300, H-1500, and H-1900. A preferred polybutene is Indopol® H-300, which has a weight average molecular weight of about 1290, a pour point of about 2° C., a glass transition temperature (Tg) of about –66.9° C. and a specific gravity of about 0.89 at 23° C.

Another liquid tackifying agent which is suitable for use in this invention is Parapol® 1300, which is a viscous liquid made from isobutylene and butene monomers and commercially available from Exxon Chemical Company. Parapol® 1300 is a colorless liquid which imparts increased tackiness to a variety of materials. Parapol® 1300 has an average molecular weight of about 1300, a flash point of about 225° C., a glass transition temperature (Tg) of about –69° C. and a refractive index at 20° C. of about 1.5. Other liquid polybutenes used in the tape composition of the present invention include Parapol® 450, 700, 950, 2200 and 2500.

The amount of tackifying additive employed depends essentially upon the level of tack desired. It will be understood that the specific tackifying additives which can be combined and the amount of each tackifying additive which can be employed to achieve the desired level of tack can be readily determined by those skilled in the art using reasonable and routine experimentation. Specifically, tackifying additives usually are employed in amounts that are effective to promote good adhesion with the roofing sheet membranes. Such amounts generally may range from about 50 phr to about 250 phr, with about 90 to about 175 being more preferred.

In the preferred embodiment, a tape composition of the present invention will include polybutene and at least one hydrocarbon resin. In such a tape composition, from about 10 to about 150 parts by weight of polybutene may be used and from about 40 to about 100 parts by weight of said hydrocarbon resin may be used.

Suitable fillers for use with this invention include reinforcing and non-reinforcing materials, and mixtures thereof, as are customarily added to rubber. Such fillers are typically utilized in conventional amounts ranging from about 5 to about 35 phr. Examples include materials as carbon black, finely ground coal, calcium carbonate, clay, silica, magnesium silicate, cryogenically ground rubber, and the like. The preferred filler employed is carbon black.

Carbon black may be used in amount ranging from about 5 to about 25 phr, and preferably in an amount of from about 5 to about 10 phr. Generally, any conventional carbon black used in compounding rubber-based adhesive formulations is suitable for use in the present invention, although for this invention, furnace blacks including FEF (fine-extrusion furnace), SRF (semi-reinforcing furnace) and GPF (general-purpose furnace) are preferred, with GPF Black being most preferred. Also, small amounts of a reinforcing carbon black, i.e., HAF (high-abrasion furnace) may have utility in this invention.

The adhesive composition also includes a cure package containing a curing agent and at least one organic accelerator in order to effect at least partial crosslinking or curing of the adhesive composition prior to its use as a seam tape. The composition is typically heat aged for a period of time to insure crosslinking. The polymer blend may be at least partially cured using any of several well-known curing agents, but preferably the cure package of the present invention includes sulfur and sulfur-containing cure systems. By "partially cured", it is meant that the composition is at least somewhat crosslinked to provide needed strength and handleability to the composition during application of the seam tape in rooftop situations. More specifically, the composition is preferably cured with an amount of curing agent which is effective to leave residual olefinic unsaturation after heating the tape composition at a temperature of about 50° C. to 150° C. for about 2 to 48 hours. It is to be expressly distinguished from those "rooftop curable" adhesive compositions which are vulcanizable, but have not been vulcanized. Generally, the sulfur/accelerator cure package employed in the adhesive composition is provided in amounts ranging from about 1.25 to about 10 phr.

As noted, the sulfur and sulfur-containing cure systems used in the present invention typically include one or more sulfur cure accelerators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazolesulfenamide, N-tert-butyl-2-benzothiazolesulfenamide (TBBS) and the like; 2-mercaptoimidazoline, N,N-diphenylguanadine, N,N-di-(2-methylphenyl)-guanadine, 2-mercaptobenzothiazole, 2-(morpholinodi-thoi)benzothiazole disulfide, zinc 2-mercaptobenzothiazole and the like; dithiocarbamates such as tellirium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate and zinc dimethyldithiocarbamate.

It should be appreciated that the foregoing list is not exclusive, and that other vulcanizing agents known in the art to be effective in the curing of EPDM terpolymers employed in the polymer blend may also be utilized. For a list of additional vulcanizing agents, see *The Vanderbilt Rubber Handbook*, RT Vanderbilt Co., Norwalk Conn. 06855 (1990). It should also be understood that these sulfur donor-type accelerators may be used in place of the elemental sulfur or in conjunction therewith. Suitable amounts of sulfur to be used in the cure package can be readily determined by those skilled in the art, and generally range from about 0.25 to 2.0 phr, while the amount of accelerator can also be readily determined by those skilled in the art and generally range from about 1 to about 8 phr.

Accelerators generally require a metal oxide, i.e., zinc oxide for cure activation in most all types of rubbers. Zinc oxide is almost always the metal oxide of choice because of its effectiveness and lack of toxicity. The amount of zinc oxide may vary, but about 1 to about 10 parts in the formulation have been found to give the desired effect. Also, in order to initiate the vulcanization process, a small amount (generally about 1 to 2 parts by weight) of stearic acid is present in the tape composition. Using heat, both zinc oxide and stearic acid act as cure activators in the presence of sulfur, one or more accelerators and unsaturated rubber to help promote the formation of sulfur crosslinks during the vulcanization process. Some of the initial chemical reactions which take place during the early stages of the vulcanization process include reacting zinc oxide with stearic acid to form salts of even greater vulcanization activity. Zinc oxide itself acts as a cure activator or vulcanization promoter, speeding the rate of reaction of elemental sulfur with the unsaturation in the diene portion of the ethylene-propylene rubber. In addition to its use as a curing component, the sulfur component of the present invention may also be used in conjunction with zinc oxide to improve the heat aging resistance of the composition.

Other ingredients may also be included in the adhesive composition. For example, additional conventional rubber compounding additives such as antioxidants, antiozonants, flame retardants and the like may be included in conventional amounts typically ranging from about 0.25 to about 4 phr.

The adhesive composition can be initially admixed by conventional means using conventional rubber compounding equipment such as a Brabender mixer, a Banbury mixer, a Sigma-blade mixer, a two-roll mill, an extruder and/or any other mixers and the like which are suitable for compounding the ingredients of the composition. The ingredients are admixed (except for curing agent e.g., sulfur, and accelerators) at temperatures ranging from about 50° C. to about 150° C. to form a masterbatch. In the preferred embodiment, the sulfur and accelerator are typically added at the end of the mixing process, after formation of the masterbatch, at lower temperatures than previously employed to prevent premature curing of the adhesive composition.

The adhesive composition can then be formed into a tape using conventional mixing extruder or other suitable extrusion equipment. The tape is generally in the form of a continuous strip having a preferred thickness of from 20 to 60 mils, however, tapes having a thickness of up to 250 mils may be useful. The desired width of the tape can range from about 1 to 5 inches, however, tapes having a width of as wide as 18 inches may have utility in this invention.

The adhesive compositions of the invention, after being extruded or otherwise preformed into suitable tape extrudates, are heat aged to effect partial crosslinking thereof. Heat aging is generally achieved by exposing the composition to elevated temperatures for a time sufficient to obtain the desired partial crosslinking, wherein the polymeric elastomer contains residual unsaturation after the curative has been consumed. Typically, the desired partial crosslinking can be achieved by heating the preferred adhesive tape compositions of the invention to temperatures ranging from about 50° C. to about 150° C. for periods of time ranging from about 2 hours to about 48 hours, and more preferably to temperatures of from about 68° C. to about 150° C. for periods of time from about 8 hours to about 36 hours. For convenience, the tape is typically provided with a conventional release paper and wound into a roll for transportation and storage.

Upon removal of the release paper, the adhesive tape composition can be used in a conventional manner such as by interposing it between the overlapping edges of adjacent roofing membranes to form a conventional roofing seam. The overlapping edges of the roofing membranes can be cleaned with soap and water or the appropriate solvent to remove any grease, oil or other contaminants which could interfere with providing an adequate seal, and/or may be primed as desired, to enhance bond formation and increase peel strength, although no primer is actually necessary to use the adhesive tape composition of the present invention. Typical solvents used for cleaning the edges of the roofing membrane include hexane, heptane or toluene, however, solvent cleaning is generally not required. Where a primer is used, one example suitable for use with this invention is Firestone's "QuickPrime®". Peel adhesion, seam shear strength, and static or dead-load shear strength are maximized by priming the overlapped edges of the two flat rubber sheets prior to forming the seam.

More specifically, the present invention is practiced by utilizing the adhesive tape between the sheets of EPDM or other types of polymeric roof sheeting materials noted herein. Once the first sheet is unrolled over the roof structure in an otherwise conventional fashion, the adhesive tape is applied to the edges of the sheet material at the seam area. Of course, the edges can be treated with a solvent and primed before applying the adhesive tape to the seam area, if needed. The next sheet is then applied onto the roof, overlapping the adhesive tape to form a laminate seam. The width of the seam can vary depending upon the requirements specified by the installer, contractor or architect, and therefore, does not constitute a limitation of the present invention. As noted hereinabove, seam widths typically vary between 1 and 5 inches, but may be wider. It will be appreciated that this practice of joining together roof sheeting membranes will eventually enable the installer to cover an entire roof.

In order to demonstrate the practice of this invention, adhesive tape compositions, listed in Table I, were prepared, and seams were formed by bonding together two layers of conventional EPDM sheet material with the adhesive tape compositions. These seams were then subjected to both peel and shear adhesion tests, the results of which are provided in Tables II and III, as well as to dead-load shear testing. The adhesive tape compositions exemplified hereinbelow are submitted for the purposes of further illustrating the nature of the present invention and are not to be considered as a limitation on the scope thereof.

The adhesive tape compositions employed for the tests are shown in Table I hereinbelow.

TABLE I

ADHESIVE TAPE FORMULATIONS

| | TAPE IDENTIFICATION NO. | | | |
|---|---|---|---|---|
| | 1 | 2 | 3 | 4 |
| EPDM Rubber[a] | 30 | 30 | 30 | 27.5 |
| EPDM Rubber[b] | 30 | 30 | 30 | 30 |
| EPDM Rubber[c] | 30 | 30 | 30 | 30 |
| High cis-1,4-polyisoprene | 10 | — | 10 | 12.5 |
| High cis-1,3-butadiene | — | 10 | — | — |
| Aliphatic hydrocarbon resin | 30 | 30 | 30 | — |
| Polybutene | 90 | 90 | 90 | 115 |
| Semi-liquid aliphatic hydrocarbon resin | 25 | 25 | 25 | 45 |
| Zinc oxide | 5 | 5 | 5 | 5 |
| Stearic acid | 1 | 1 | 1 | 1 |
| GPF Carbon Black | 5 | 5 | 5 | 5 |
| Sulfur | 1.25 | 1.00 | 1.00 | 1.33 |
| DPTH | 1.25 | 1.25 | 1.25 | 1.66 |
| TMTDS | 0.50 | 0.50 | 0.50 | 0.67 |
| TBBS | 0.50 | 0.40 | 0.40 | 0.40 |
| TOTAL | 259.50 | 256.15 | 259.15 | 275.06 |

[a]Weight average molecular weight; from about 150,000 to 275,000
[b]Weight average molecular weight; from about 10,000 to 125,000
[c]Weight average molecular weight; from about 50,000 to 150,000

Each of the adhesive tape compositions were mixed in a Brabender mixer. The batch temperature was approximately 140° C. during preparation of the 300 gram masterbatch which was mixed in about 30 minutes. The sulfur/accelerator cure package was incorporated in the tape masterbatch using a two-roll mill. The mill roll temperature was about 45° C. to about 60° C. The tape compositions were on the mill for about 8 minutes.

Each of the prepared adhesive tape compositions was placed on a conventional release paper commercially available from Daubert Coated Products and compression molded for about 10 seconds at 100° C. to form a tape about 35 to 50 mils thick. The tapes were then at least partially cured in a forced air oven for about 3 hours at about 116° C. prior to being subjected to adhesion testing.

Detailed Peel and Shear Adhesion Test Procedure

Each of the above tape compositions was subjected to adhesion testing which necessitated the building of test pads comprising sheets of EPDM roofing material, according to the following procedure.

1. A number of 6×9-inch, uncleaned sheets of sulfur-cured, factory-produced, conventional black EPDM roofing membrane of approximately 45 mils in thickness were prepared and primed with a conventional solvent-based primer commercially available under the tradename Adco HSSP-1. The primer was allowed to air dry at room temperature for at least 30 minutes before assembling the adhesion test pads.
2. Preparation of test samples in the shear configuration consisted of removing the release paper from a one-inch wide strip of adhesive tape and applying the tape directly along the edge of a piece of primer-coated membrane. After successfully mating the tape to the primer-coated membrane, the release paper was removed from the other side of the adhesive tape composition and firmly secured by hand to a second piece of primer-coated EPDM membrane. The peel adhesion test samples were prepared by removing the release paper from one side of a three-inch wide strip of adhesive tape and firmly securing the tape to the surface of a piece of EPDM membrane. After one side of the tape was successfully mated by hand to the primer-coated surface of a piece of EPDM membrane, the release paper on the other side of the three-inch wide strip of tape was removed and the tape was firmly secured by hand to a second piece of primer-coated EPDM sheeting.
3. Each test pad then was individually mated by rolling a 2.75-inch wide, 15 pound metal roller in a back and forth motion at least four times over the surface of the seam. The test pads were then aged an additional 30 minutes at room temperature.
4. A clicker machine with a one-inch wide die was utilized to prepare a number of test specimens for peel and shear adhesion testing. Test specimens prepared in the shear configuration were also tested in the static dead-load shear strength test.
5. The one-inch wide specimens were aged for 24 hours at either about 23° C. or about 70° C. prior to testing, and then either were tested at that same temperature or, in some test situations where specimens were aged at 70° C., were tested after being allowed to equilibrate at 23° C. for at least 30 minutes prior to testing.
6. The one-inch wide specimens were tested at the rate (both crosshead and chart speed) of two inches per minutes using the adhesion test method set forth in ASTM D-413 (machine method). Both peel and shear adhesion strength were determined at room temperature (i.e., 23° C.) as well as at 70° C.
7. Adhesion strength is defined as:
   peel adhesion strength (lbs./inch)=pounds force/sample width shear adhesion strength (lbs./square inch)=pounds force/sample contact area.

Adhesion test samples 1–3 prepared from the adhesive tape compositions of Table I are listed in Tables II and III as Examples 1, 2, and 3 hereinbelow. Table II shows a comparison of peel adhesion properties obtained on the test samples and a conventional butyl rubber-type adhesive tape Example 5 (butyl tape) prepared in a similar manner and tested by the same method of procedure, at temperatures of about 23° C. and 70° C. Table III shows a comparison of shear adhesion properties obtained on the test samples and a conventional butyl rubber-type adhesive tape Example 5 (butyl tape) prepared in a similar manner and tested by the same method of procedure, at temperatures of about 23° C. and 70° C.

TABLE II

PEEL ADHESION TESTING

| | TAPE EXAMPLE NO. | | | | |
|---|---|---|---|---|---|
| | 1 | 2 | 3 | 4 | (butyl tape) 5 |
| Aged 24-hours at 23° C./Tested at 23° C. | | | | | |
| Lbs./Inch | 5.2 | 10.0 | 6.50 | — | 6.1 |
| Type of failure | (A) | (A) | (A) | | (A) |
| Aged 24-hours at 70° C./Tested at 23° C. | | | | | |
| Lbs./Inch | 8.2 | 10.0 | 5.2 | 6.3 | 8.0 |
| Type of failure | (A) | (A) | (A) | (A) | (A) |
| Aged 24-hours at 70° C./Tested at 70° C. | | | | | |
| Lbs./Inch | 2.4 | 5.5 | 3.5 | — | 2.9 |
| Type of failure | (A/C) | (A) | (A) | | (A) |

(A) adhesive failure: separation occurs between the layer of primer and black EPDM membrane
(A/C) (adhesive/cohesive failure) A majority of the separations occur between the layer of primer and black EPDM membrane, however, some tearing resulted in the tape itself.

TABLE III

SHEAR ADHESION TESTING

| | TAPE EXAMPLE NO. | | | | |
|---|---|---|---|---|---|
| | 1 | 2 | 3 | 4 | (butyl tape) 5 |
| Aged 24-hours at 23° C./Tested at 23° C. | | | | | |
| Lbs./Inch$^2$ | 20.2 | 18.2 | 17.6 | — | 18.0 |
| Type of failure | (A) | (A) | (A) | | (A) |
| Aged 24-hours at 70° C./Tested at 23° C. | | | | | |
| Lbs./Inch$^2$ | 35.3 | 28.4 | 28.9 | 22.8 | 26.5 |
| Type of failure | (A) | (A) | (A) | (A) | (A) |
| Aged 24-hours at 70° C./Tested at 70° C. | | | | | |
| Lbs./Inch$^2$ | 12.9 | 10.8 | 11.4 | — | 11.0 |
| Type of failure | (A) | (A/C) | (A) | | (A) |

(A) adhesive failure: separation occurs between the layer of primer and black EPDM membrane
(A/C) (adhesive/cohesive failure) A majority of the separations occur between the layer of primer and black EPDM membrane, however, some tearing resulted in the tape itself.

Peel adhesion as shown in Table II for the Control (butyl tape) adhesive tape aged 24 hours at 23° C. and tested at 23° C. was 6.1 lbs./inch, while seam shear strength for the Control (butyl tape) adhesive tape using the same aging time and temperatures was 18 lbs./square inch. The adhesive tape compositions of the present invention generally showed peel and shear adhesion values comparable to directionally better than those of the Control using the same aging time and temperature. These tape compositions provide excellent long-term heat aging, weathering resistance, and low temperature properties as compared to adhesive tape compositions containing butyl rubber. Moreover, the adhesive tape compositions provide more surface tack, better "quick-grab", and higher green strength compared to adhesive tape compositions containing 100 percent EPDM rubber.

With respect to tape Example No. 4, a partially cured adhesive tape composition comprising substantially equal amounts of three EPDM rubbers and 12.5 parts of polyisoprene and aged in peel and shear adhesion test pads for 24 hours at 70° C. and tested at 23° C. yielded peel adhesion values of 6.3 lbs./inch and 22.8 lbs./square inch seam shear strength. After aging the same adhesive tape composition in peel and shear adhesion test pads for nine weeks at 70° C., adhesions values increased to 6.6 lbs./inch (in the peel configuration and 35.3 lbs./square inch (in the shear configuration) when tested at 23° C., as shown in Table IV hereinbelow. All of the test failures involved separations between the layer of primer and the black EPDM membrane. Seams that improve upon aging at elevated temperature for extended periods of time are said to have good heat aging resistance.

TABLE IV

PEEL ADHESION AND SHEAR ADHESION TESTING FOR SAMPLE AGED 9 WEEKS AT 70° C./TESTED AT 23° C.

| TAPE EXAMPLE NO. | PEEL ADHESION | SHEAR ADHESION |
|---|---|---|
| 4 | 6.6 lbs./inch | 35.3 lbs./sq. inch |

The adhesion results provided hereinabove demonstrate that the use of adhesive tape compositions comprising a polymer blend of EPDM rubber and an adhesive-enhancing polymer are sufficient to form acceptable adhesive tapes for use in forming seams to bond EPDM rubber roofing membranes together for the purpose of covering roofs.

A static or dead-load shear strength test was also performed on each of the test samples. Such a test is useful for determining the strength of an adhesive tape interposed between the overlapped edges of two flat rubber sheets. In this instance, the static or dead-load shear strength test was conducted to determine the creep resistance of the adhesive tape compositions.

As noted previously, the test samples for static or dead load shear strength testing were prepared using the shear configuration in accordance with the invention as depicted in the drawing figures, and one-inch wide shear adhesion test samples were prepared in accordance with the peel and shear testing procedure detailed hereinabove. Before placing the test specimens in the 70° C. forced air oven, both sides of each test sample were marked with a rubber marking pen at the seam step-off. This made it easier to note any slippage that occurred during the static dead-load shear strength test. After aging the one-inch wide specimens for 30 minutes, they were suspended in a vertical position in a 70° C. forced air oven. A 300 gram weight was applied to the unattached end of each dead-load specimen. After 24 hours of exposure at 70° C., the splice should not creep or slip more than ⅛inch. Slippage of the seam in excess of ⅛inch denotes a failure of the test.

All of the specimens were tested in duplicate, and all passed this test by supporting the 300-gram weight held in the vertical position in the 70° C. forced air oven for a minimum of 24 hours without slippage or failure. Seams that pass the dead-load shear test are deemed to have good creep resistance.

Thus it should be evident that the adhesive tape compositions and related methods of the present invention are highly effective in joining together rubber roof sheeting membranes. This invention is particularly suitable for use with EPDM rubber sheeting for covering roofs, but is not necessarily limited thereto. For example, the tape compositions and method of the present invention can be used to join together other rubber articles such as protective liners, agricultural pond liners, fabric-reinforced liners, sheets for use in the building and construction industry as laminates for clean sheet and flashing and to secure other building accessories such as walkway pads, pipe boots, deck plates, T-joint covers and the like.

Furthermore, as noted hereinabove, the application of a primer, while used in the foregoing examples, is not necessary. However, the application of the primer eliminates the need to wash or scrub the overlapped edges of the flat rubber sheets with a suitable cleaning solution prior to application of the preformed adhesive tape.

Based upon the foregoing disclosure, it should now be apparent that the use of the adhesive tape composition described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the fillers and tackifying additives provided according to the present invention are not necessarily limited to those described in the illustrative examples. Moreover, as noted hereinabove, other means for mixing can be substituted for the Brabender mixer used to mix the tape masterbatch. The adhesive tape composition of this invention can be used to produce seam joints exhibiting excellent peel adhesion and shear strengths, and creep resistance. The adhesive composition of this invention should demonstrate good weathering resistance, moisture and heat aging resistance, and low temperature properties as compared to adhesive tape compositions containing butyl rubber. The adhesive tape composition of this invention provides more surface tack, better "quick-grab", and higher green strength as compared to adhesive tape compositions containing 100 percent EPDM rubber. Thus, the scope of the invention shall include all modifications and variations that may fall within the scope of the attached claims.

What is claimed is:

1. A laminate seam of flat rubber sheet material for roofing comprising:

two layers of sheet material, one of said layers at least partially overlapping the other of said layers; and an adhesive composition in the form of a pressure sensitive adhesive tape interposed between the area of overlapping of said layers to form a seam, said adhesive composition comprising a polymer blend comprising from about 50 to 90 parts by weight of at least one EPDM rubber having a weight average molecular weight up to about 275,000 and from about 50 to 10 parts by weight of an adhesive-enhancing polymer selected from the group consisting of polyisoprene, polybutadiene, and ethylene-propylene copolymer and mixtures thereof;

at least one compatible tackifying additive; and a cure package containing a curing agent and at least one accelerator, for said polymer blend, said adhesive composition being devoid of butyl rubber and having a peel adhesion seam strength of at least 5.2 lbs/inch upon aging 24 hours at 23° C.

2. A laminate seam, as set forth in claim 1, wherein said two layers of sheet material includes polymeric sheeting material selected from the group consisting of EPDM, butyl rubber, neoprene, polyvinyl chloride, chlorinated polyethylene, thermoplastic polyolefin rubber, and modified bitumen.

3. A laminate seam, as set forth in claim 1, wherein said two layers of sheet material include a primer applied to the surface of said area of overlapping to increase bond formation between said two layers of sheet material.

4. A laminate seam, as set forth in claim 1, wherein said polymer blend includes a first EPDM rubber having a weight average molecular weight of at least about 150,000; and a second EPDM rubber having a weight average molecular weight of up to about 125,000.

5. A laminate seam, as set forth in claim 4, wherein said polymer blend includes a third EPDM rubber, said polymer blend having substantially equal amounts, by weight, of each of said EPDM rubbers.

6. A laminate seam of flat rubber sheet material for roofing comprising:

two layers of sheet material, one of said layers at least partially overlapping the other of said layers; and an adhesive composition in the form of a pressure sensitive adhesive tape interposed between the area of overlapping of said layers to form a seam, said adhesive composition comprising a polymer blend comprising at least two EPDM rubbers and an adhesive-enhancing polymer selected from the group consisting of polyisoprene, polybutadiene, and ethylene-propylene copolymer and mixtures thereof, wherein at least one of said EPDM rubbers has a weight average molecular weight of from about 150,000 to 275,000 and at least another of said EPDM rubbers has a weight average molecular weight different from the weight average molecular weight of the first;

at least one compatible tackifying additive; and a cure package containing a curing agent and at least one accelerator, for said polymer blend, said adhesive composition being devoid of butyl rubber.

7. A laminate seam, as set forth in claim 6, wherein said two layers of sheet material includes polymeric sheeting material selected from the group consisting of EPDM, butyl rubber, neoprene, polyvinyl chloride, chlorinated polyethylene, thermoplastic polyolefin rubber, and modified bitumen.

8. A laminate seam, as set forth in claim 6, wherein said two layers of sheet material include a primer applied to the surface of said area of overlapping to increase bond formation between said two layers of sheet material.

9. A laminate seam, as set forth in claim 6, wherein at least another of said EPDM rubbers has a weight average molecular weight of up to about 125,000.

10. An adhesive tape composition, as set forth in claim 9, wherein at least another of said EPDM rubbers has a weight average molecular weight of from about 50,000 to 150,000.

11. A laminate seam, as set forth in claim 6, wherein said polymer blend includes from about 50 to 90 parts by weight of said EPDM rubbers and from about 10 to about 50 parts by weight of said adhesive-enhancing polymer, to total 100 parts by weight of said polymer blend.

* * * * *